United States Patent
Alarcon

(10) Patent No.: US 9,194,299 B2
(45) Date of Patent: Nov. 24, 2015

(54) ANTI-TORSION ASSEMBLY

(71) Applicant: United Technologies Corporation, Hartford, CT (US)

(72) Inventor: Andrew G. Alarcon, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 230 days.

(21) Appl. No.: 13/724,226

(22) Filed: Dec. 21, 2012

(65) Prior Publication Data
US 2014/0173897 A1    Jun. 26, 2014

(51) Int. Cl.
*B23P 15/00* (2006.01)
*F02C 7/32* (2006.01)
*F01D 21/04* (2006.01)

(52) U.S. Cl.
CPC ............... *F02C 7/32* (2013.01); *F01D 21/045* (2013.01); *Y02T 50/672* (2013.01); *Y10T 29/49245* (2015.01)

(58) Field of Classification Search
USPC ............... 29/888, 888.02, 888.022–888.025; 60/645, 649
See application file for complete search history.

(56) References Cited

U.S. PATENT DOCUMENTS

| | | |
|---|---|---|
| 2,994,472 A | 8/1961 | Botje |
| 4,251,185 A | 2/1981 | Karstensen |
| 4,730,386 A | 3/1988 | Fieberg et al. |
| 4,786,232 A | 11/1988 | Davis et al. |
| 5,160,248 A | 11/1992 | Clarke |
| 5,201,887 A | 4/1993 | Bruchez, Jr. et al. |
| 5,318,402 A | 6/1994 | Bailey et al. |
| 5,320,486 A | 6/1994 | Walker et al. |
| 6,053,697 A | 4/2000 | Piekarski et al. |
| 6,227,794 B1 | 5/2001 | Wojtyczka et al. |
| 6,364,603 B1 | 4/2002 | Czachor et al. |
| 6,382,905 B1 | 5/2002 | Czachor et al. |
| 6,637,186 B1 | 10/2003 | Van Duyn |
| 6,935,836 B2 | 8/2005 | Ress, Jr. et al. |
| 7,241,108 B2 | 7/2007 | Lewis |
| 7,694,505 B2 | 4/2010 | Schilling |
| 7,797,809 B2 | 9/2010 | Costa et al. |
| 7,866,939 B2 | 1/2011 | Harper et al. |
| 7,914,251 B2 | 3/2011 | Pool et al. |
| 2007/0119174 A1* | 5/2007 | Russo et al. ............ 60/645 |
| 2008/0069688 A1 | 3/2008 | Harper et al. |

(Continued)

OTHER PUBLICATIONS

Gunston, Bill, Editor, "Pratt & Whitney PW8000" Jane's Aero-Engines, Mar. 2000, pp. 510-512, Issue Seven, Janes Information Group Limited, Coulsdon, United Kingdom.

(Continued)

*Primary Examiner* — Richard Chang
(74) *Attorney, Agent, or Firm* — Miller, Matthias & Hull LLP

(57) ABSTRACT

An anti-torsion assembly for positioning and securing a thermally conforming liner within a fan containment case is provided. The anti-torsion assembly minimizes the amount of machining that must be done prior to assembly. The anti-torsion assembly comprises a torque block with outwardly-opposing side surfaces and a pair of L-brackets. Each L-bracket has a bracket surface that faces one of the outwardly-opposing side surfaces of the torque block. A wear pad is affixed to each bracket surface. The L-brackets are positioned onto the thermally conforming liner using a spacer having a spacer width within a predetermined tolerance. A method of assembling a fan case assembly is also provided.

20 Claims, 6 Drawing Sheets

(56) References Cited

U.S. PATENT DOCUMENTS

| | | |
|---|---|---|
| 2009/0056343 A1 | 3/2009 | Suciu et al. |
| 2010/0111675 A1 | 5/2010 | Wojtyczka et al. |
| 2011/0044807 A1 | 2/2011 | Bottome |
| 2011/0123326 A1 | 5/2011 | DiBenedetto et al. |

OTHER PUBLICATIONS

International Search Report and Written Opinion received in related International Application No. PCT/US13/72986; report dated Apr. 28, 2014.

* cited by examiner

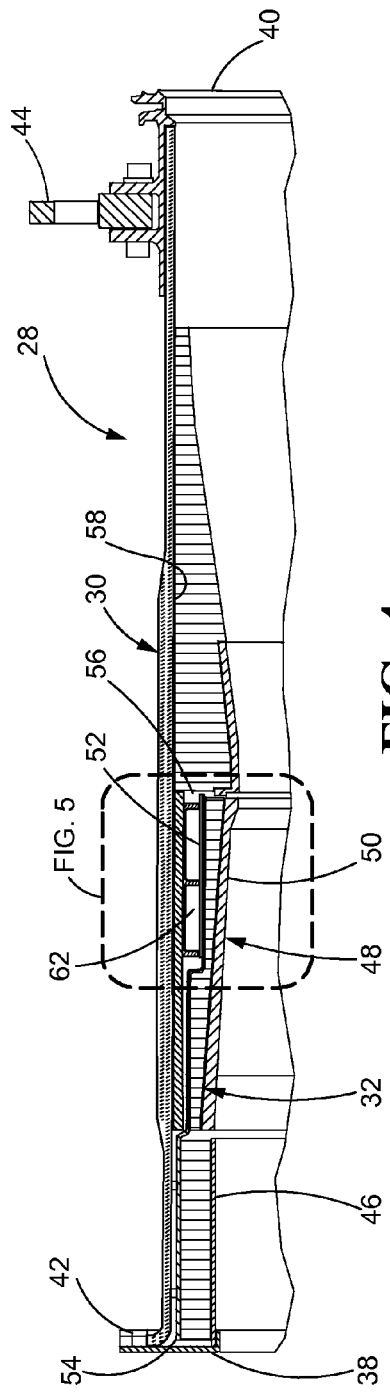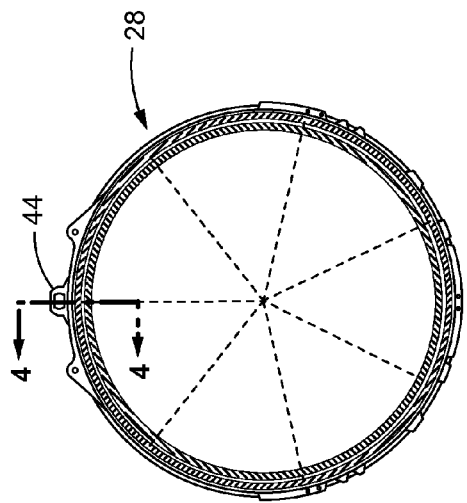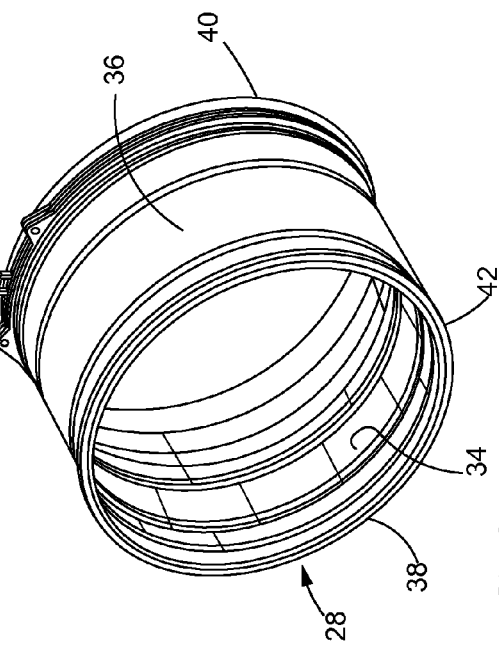

ANTI-TORSION ASSEMBLY

FIELD OF THE DISCLOSURE

The subject matter of the present disclosure relates generally to gas turbine engines. More particularly, the subject matter of the present disclosure relates to an anti-torsion assembly comprising L-bracket-mounted wear pads for positioning and securing a thermally conforming liner within a fan containment case of a gas turbine engine.

BACKGROUND OF THE DISCLOSURE

Gas turbine engines such as those used on jet aircraft generally comprise an air inlet, a fan section, a single or multi-stage compressor section, a combustion section downstream of the compressor section, a single or multi-stage turbine section, and an exhaust nozzle. Air entering the air inlet flows through the compressor section and into the combustion section where it provides oxygen for fuel combustion. The hot combustion gases pass through the turbine section and exit the exhaust nozzle, providing a portion of the engine thrust.

The fan section generally comprises fan blades mounted to a hub and enclosed within a fan case assembly. The fan case assembly generally comprises a fan containment case and a thermally conforming liner disposed within the fan containment case. The clearance between the fan blade tips and the thermally conforming liner is generally kept to a minimum for maximum engine efficiency.

To position the thermally conforming liner with respect to the fan containment case and to minimize or eliminate any relative movement of the two parts, a series of spaced apart anti-torsion assemblies may be provided. Each anti-torsion assembly comprises a torque block mounted to an inner diameter surface of the fan containment case and a pair of L-brackets mounted to an outer diameter surface of the thermally conforming liner. The torque block may carry wear pads on the sides of the torque block facing the L-brackets. Both the torque block and the wear pads can require machining to make sure the torque block and wear pads meet allowable tolerances.

The present disclosure is directed to an anti-torsion assembly comprising a torque block, L-brackets and L-bracket-mounted wear pads. The present disclosure is also directed to a method of assembling a fan case assembly using the anti-torsion assembly of the disclosure.

SUMMARY OF THE DISCLOSURE

According to one embodiment of the disclosure, an anti-torsion assembly comprising a torque block and a pair of L-brackets is provided. The torque block has outwardly-opposing side surfaces. Each L-bracket has an inner-facing bracket surface. A wear pad is affixed to each inner-facing bracket surface and adapted to abut one of the outwardly-opposing side surfaces of the torque block.

The torque block may be affixed to a fan containment case. The L-brackets may be affixed to a thermally conforming liner disposed within the fan containment case so that each inner-facing bracket surface faces one of the outwardly-opposing side surfaces of the torque block.

In an aspect of the disclosure the wear pads are spaced apart from each other a predetermined distance.

In a further aspect the torque block has a circumferential width defined as the distance between the outwardly-opposing surfaces which is slightly less than the predetermined distance.

In a still further aspect the predetermined distance is equal to the width of a spacer used to locate the L-brackets into the thermally conforming liner. In other words, the spacer has a spacer width and the predetermined distance is equal to the spacer width.

In another aspect each wear pad has an inner-facing surface adjacent one of the outwardly-opposing side surfaces of the torque block and separated therefrom by a gap distance. Because the spacer is used to locate the L-brackets into the thermally conforming liner, the sum of the gap distances equals the spacer width minus the circumferential width of the torque block.

Each gap distance has a minimum value of zero and a maximum equal to the spacer width minus the circumferential width.

In another aspect the spacer has a minimum spacer width. The circumferential width of the torque block is smaller than the minimum spacer width.

Each L-bracket may comprise a foot member and a leg member extending from the foot member, wherein the inner-facing bracket surface is located on the leg member.

In another aspect of the disclosure a method of assembling a fan case assembly is provided. The method may comprise the steps of: (a) mounting multiple torque blocks onto an inner diameter surface of a fan containment case, each torque block having outwardly-opposing side surfaces and a circumferential width; (b) positioning multiple pairs of L-brackets onto an outer diameter surface of a thermally conforming liner, each L-bracket carrying a wear pad on an inner-facing surface of the L-bracket, each pair of L-brackets being positioned so that the wear pads abut a spacer, the spacer having a spacer width; (c) securing the L-brackets to the thermally conforming liner; (d) removing the spacers to create a channel between each pair of L-brackets; and (e) inserting the thermally conforming liner into the fan containment case so that the torque blocks extend into the channels.

In an aspect of the assembly method, before step (a) the torque block is machined so that its circumferential width is within a predetermined tolerance.

In another aspect, before step (a) the torque block is machined so that its circumferential width is slightly less than the spacer width.

In another aspect, the thermally conforming liner may be positioned within the fan containment case so that an inner-facing surface of each wear pad is adjacent one of the outwardly-opposing side surfaces of the torque block and is separated therefrom by a gap distance. The maximum gap distance for each wear pad equals the spacer width minus the circumferential width.

The multiple pairs of L-brackets may be secured to the thermally conforming liner in circumferentially spaced apart relationship.

In another aspect of the disclosure an anti-torsion assembly is provided comprising a torque block affixed to a fan containment case, the torque block having outwardly-opposing side surfaces, the outwardly-opposing side surfaces defining a circumferential width; a pair of L-brackets affixed to a thermally conforming liner disposed within the fan containment case, each L-bracket comprising a foot member and a leg member extending from the foot member, the leg member having a bracket surface facing one of the outwardly-opposing side surfaces; and a wear pad affixed to each bracket surface, each wear pad having an inner-facing surface adjacent one of the outwardly-opposing side surfaces and separated therefrom by a gap distance; wherein the maximum gap distance equals a predetermined distance minus the circumferential width.

The assembly may further comprise a spacer having a spacer width, wherein the predetermined distance is equal to the spacer width.

The torque block and L-brackets may be made of aluminum. The wear pads may be made of a lightweight, low friction wear resistant material such as fiber-reinforced composite fabric or polytetraflouroethylene.

In another aspect of the disclosure a method of repairing a fan case assembly comprising a thermally conforming liner disposed within a fan containment case, a torque block affixed to the fan containment case, the torque block having a circumferential width, and a pair of L-brackets affixed to the thermally conforming liner, is provided. The method may comprise the steps of: (a) removing the thermally conforming liner from the fan containment case; (b) machining a torque block so that its circumferential width meets a predetermined tolerance; (c) mounting the machined torque block to the fan containment case; (d) positioning a pair of wear pad carrying L-brackets onto an outer diameter surface of the thermally conforming liner so that the wear pads abut a spacer, the spacer having a spacer width; (e) securing the L-brackets to the thermally conforming liner; (f) removing the spacer; and (g) re-inserting the thermally conforming liner into the fan containment case so that the torque block is interposed between the L-brackets.

Although the different examples described herein may have the specific components shown in the illustrations, embodiments of this disclosure are not limited to those particular combinations of components. It is possible to use some of the components or features from one of the examples in combination with features or components from another one of the examples.

BRIEF DESCRIPTION OF THE DRAWINGS

So that the manner in which the concepts of the present disclosure recited herein may be understood in detail, a more detailed description is provided with reference to the embodiments illustrated in the accompanying drawings. It is to be noted, however, that the accompanying drawings illustrate only certain embodiments and are therefore not to be considered limiting of the scope of the disclosure, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which:

FIG. 2 is a perspective view of an embodiment of a fan case assembly;

FIG. 3 is a forward-looking-aft section view of the fan case assembly of FIG. 2;

FIG. 4 is a cross-sectional view of the fan case assembly of FIG. 3 taken along line 4-4 of FIG. 3;

DETAILED DESCRIPTION

In the disclosure that follows certain relative positional terms are used such as "forward", "aft", "upper", "lower", "above", "below", "inner", "outer" and the like. These terms are used with reference to the normal operational attitude of a jet engine and should not be considered otherwise limiting. The forward end of a jet engine generally refers to the air inlet end and the aft end generally refers to the exhaust end. Also, "radially outward" generally refers to a direction away from the engine center line while "radially inward" refers to a direction toward the engine center line.

The present disclosure relates to an anti-torsion assembly comprising L-bracket-mounted wear pads for positioning and securing a liner within a fan containment case of a gas turbine engine. The present disclosure also relates to a method of assembling and repairing a fan case assembly using the anti-torsion assembly of the present disclosure.

Figure 1:
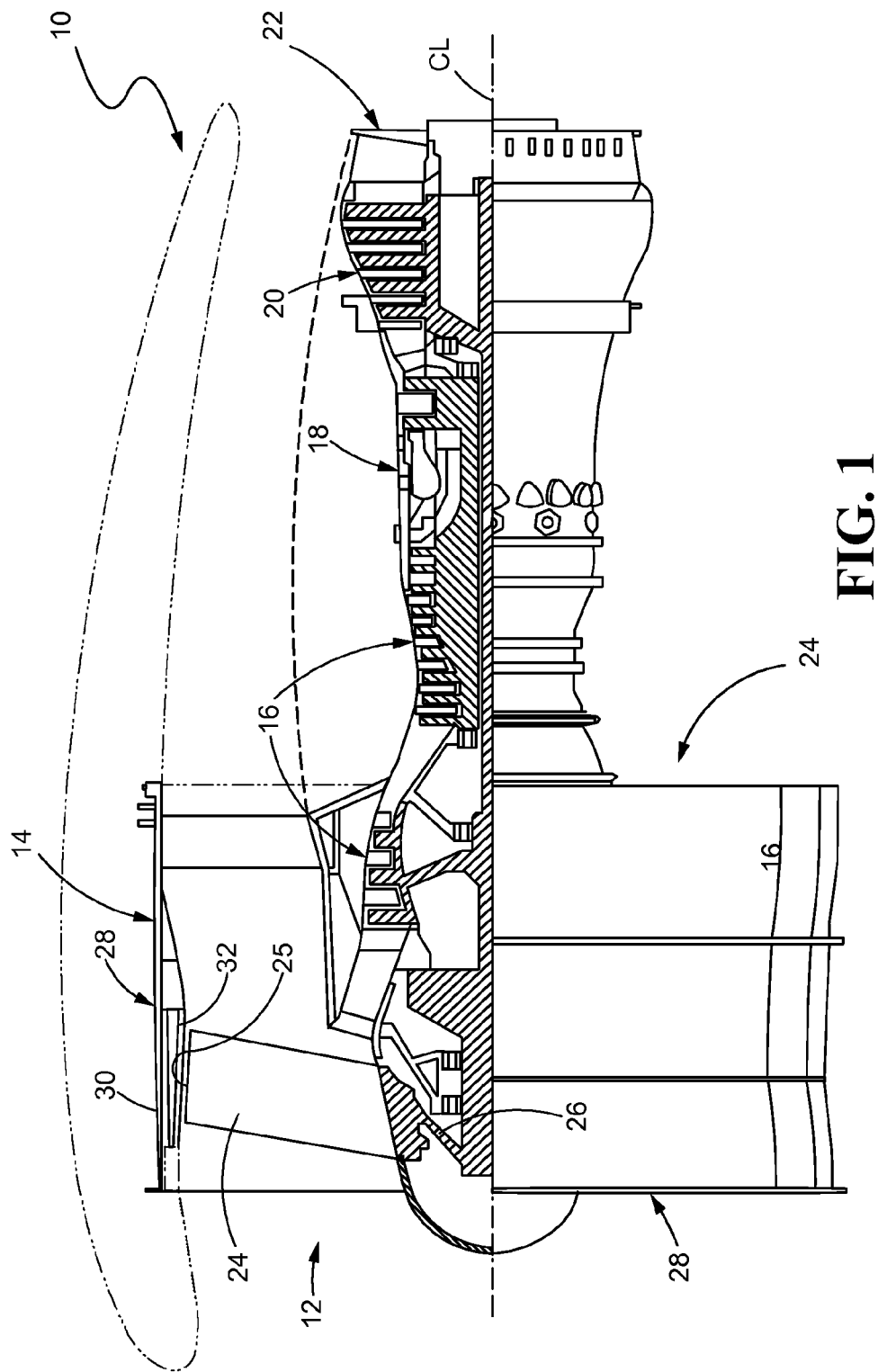
FIG. 1 is a longitudinal sectional view of an exemplary gas turbine engine.

Turning to the figures, FIG. 1 is a longitudinal sectional view of an exemplary gas turbine engine 10. The engine center line is shown indicated as CL. The gas turbine engine 10 comprises an air inlet 12, a fan section 14, a single or multi-stage compressor section 16, a combustion section 18 downstream of the compressor section 16, a single or multi-stage turbine section 20, and an exhaust nozzle 22. Air entering the air inlet 12 flows through the compressor section 16 and into the combustion section 18 where it provides oxygen for fuel combustion. The hot combustion gases pass through the turbine section 20 and exit the exhaust nozzle 22, providing a portion of the engine's thrust.

The fan section 14 generally comprises fan blades 24 mounted to a hub 26 and enclosed within a fan case assembly 28. The fan case assembly 28 comprises a thermally conforming liner 32 disposed within a fan containment case 30. The clearance between the fan blade tips 25 and the inner diameter surface of the thermally conforming liner 32 is generally kept to a minimum for maximum engine efficiency.

FIG. 2 is a perspective view of an embodiment of a fan case assembly 28, and FIG. 3 is a forward-looking-aft section view of the fan case assembly of FIG. 2. The fan case assembly 28 has an inner surface 34, an outer surface 36, an upstream end 38 and a downstream end 40. The fan case assembly 28 generally comprises a radially outwardly projecting flange 42 near the upstream end 38 and may also comprise a mounting ring structure 44 near the downstream end 40.

FIG. 4 is a cross-sectional view of the fan case assembly 28 of FIG. 3 taken along line 4-4 to show the fan case assembly 28 in more detail. The thermally conforming liner 32 is substantially cylindrical and extends from an upstream end 54 (adjacent the upstream end 38 of the fan case assembly) to a downstream end 56, and may comprise progressively radially inwardly staggered sections on its outer diameter (OD) surface 59. The thermally conforming liner 32 forms an annular structure surrounding the fan blades 24.

Proximate the upstream end 54 of the thermally conforming liner 32 is a forward acoustic liner 46 formed of honeycomb or other suitable material. Downstream of the acoustic liner 46 is an abradable liner assembly 48 including an abradable rub material 50 having an inboard surface 52 in close proximity to the fan blade tips 25 which are shown in FIG. 1.

Figure 5:
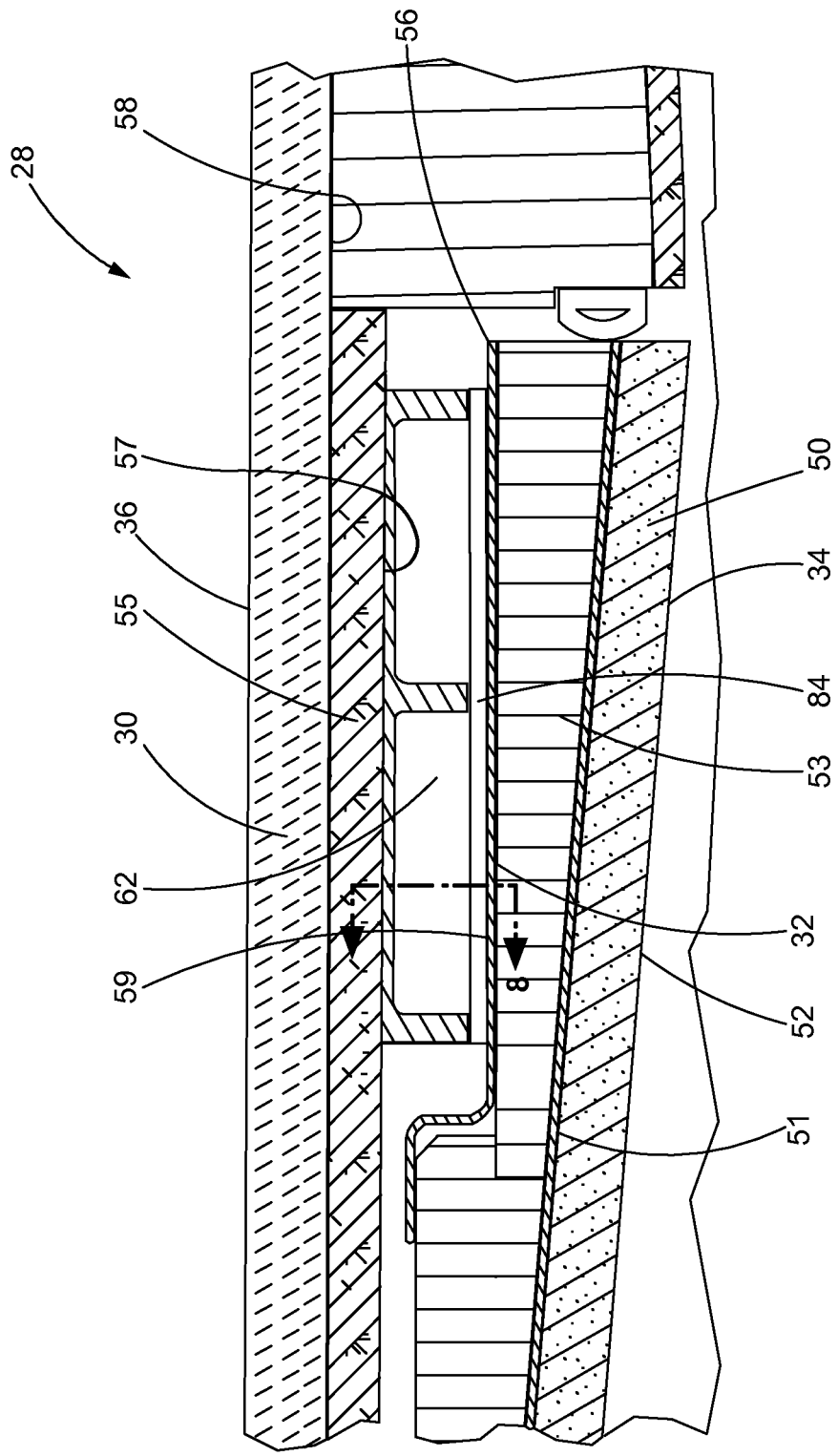
FIG. 5 is an enlarged view of a portion of the fan case assembly of FIG. 4.

FIG. 5 is an enlarged view of a portion of the fan case assembly 28 of FIG. 4. The radially outboard surface of the abradable rub material 50 is mounted to an aluminum septum 51. The aluminum septum 51 forms an inboard liner of a wedge honeycomb structure 53.

A torque block 62 is mounted to a liner such as a ballistic liner 55 which in turn is mounted to an inner diameter surface 58 of the fan containment case 30. Alternatively, the torque block 62 may be mounted directly to the inner diameter surface 58 of the fan containment case 30. A series of paired L-brackets 84, only one of which is shown in part in FIG. 5, are mounted onto an outer diameter surface 59 of the thermally conforming liner 32 radially opposite the torque block 62. The function of the torque blocks 62 and L-brackets 84 will now be explained.

Each torque block 62 and pair of L-brackets 84 form part of an anti-torsion assembly 60. The anti-torsion assemblies 60 help position the thermally conforming liner 32 with respect to the fan containment case 30 and eliminate or minimize any relative movement of the thermally conforming liner 32 with respect to the fan containment case 30. Each anti-torsion assembly 60 comprises a torque block 62 mounted to the inner diameter surface 58 of the fan containment case 30 or to the inner diameter surface 57 of the ballistic liner 55 and a pair of L-brackets 84 mounted to the outer diameter surface 59 of the thermally conforming liner 32. During assembly of the fan section 14, the thermally conforming liner 32 is slipped into the fan containment case 30 and positioned and locked into place by the anti-torsion assemblies 60. The anti-torsion assemblies 60 function by constraining (capturing) each torque block 62 within a pair of L-brackets 84, thereby limiting relative movement of the thermally conforming liner 32 with respect to the fan containment case 30.

Figure 6:
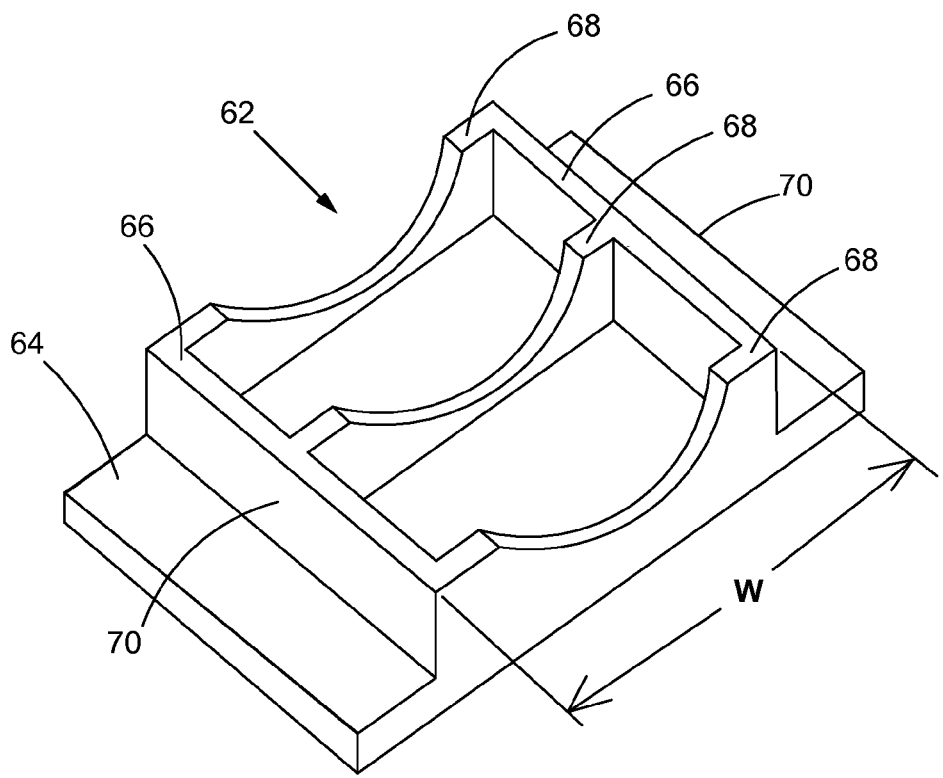
FIG. 6 is a perspective view of an embodiment of a torque block.
Figure 8:
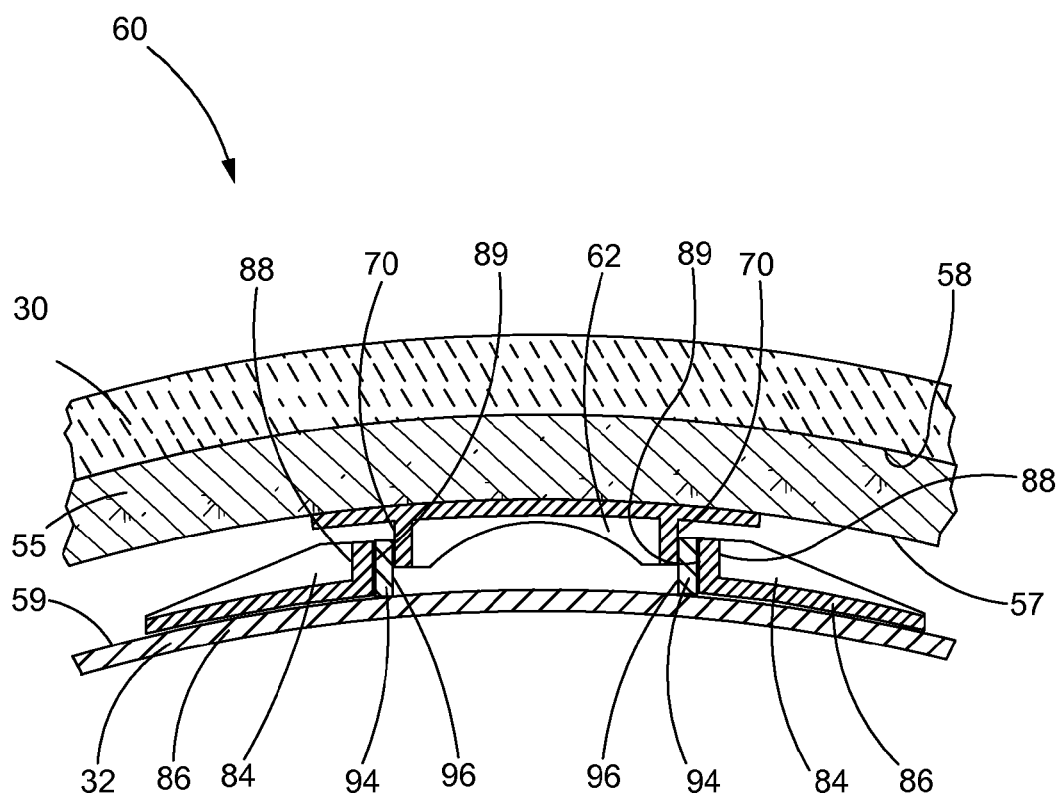
FIG. 8 is an axial view of an embodiment of an anti-torsion assembly taken along line 8-8 of FIG. 5.

FIG. 6 is a perspective view of an embodiment of a torque block 62. The torque block 62 may comprise a mounting plate 64, two side members 66 and a plurality of cross members 68 extending between the side members 66. The side members 66 and the cross members 68 extend from and may be integrally formed with or affixed to the mounting plate 64. The side members 66 have outwardly-opposing side surfaces 70 which face the L-brackets 84 when the L-brackets 84 and the torque block 62 are brought into axial alignment as shown in FIG. 8. The outwardly-opposing side surfaces 70 are so called because they face away from each other. The outwardly-opposing side surfaces 70 define the circumferential width W of the torque block 62.

Figure 7:
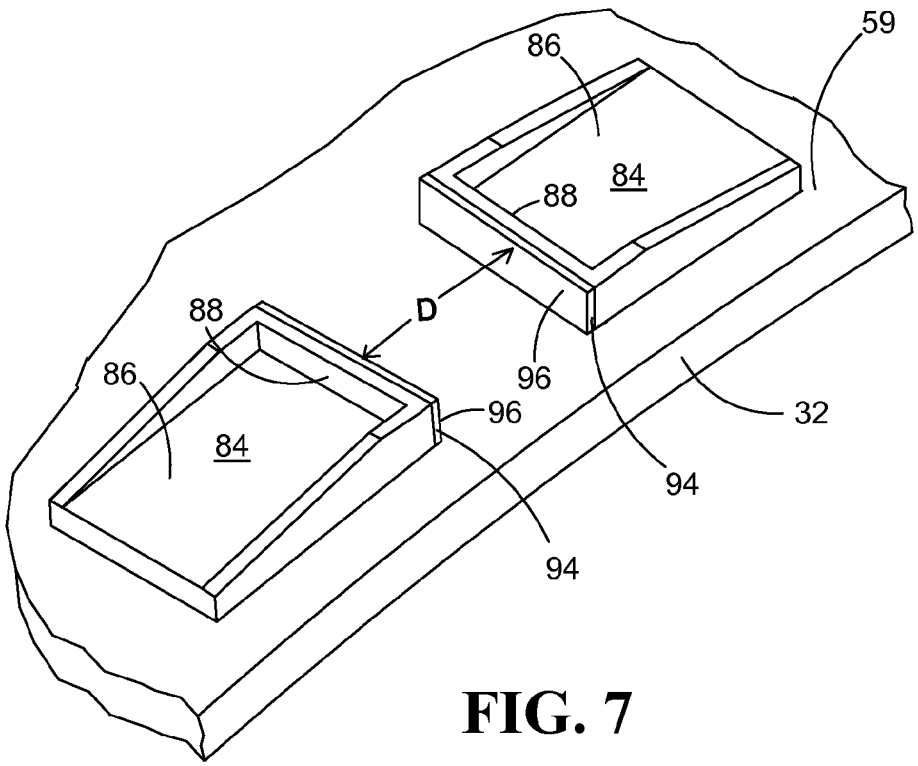
FIG. 7 is a perspective view of a pair of L-brackets 84 mounted to a thermally conforming liner.

FIG. 7 is a perspective view of a pair of exemplary L-brackets 84 mounted to a thermally conforming liner 32. Each L-bracket 84 may comprise a foot member 86 for mounting the L-bracket 84 to the thermally conforming liner 32 and a leg member 88 extending substantially orthogonally and radially outward from an inner end of the foot member 86. Each leg member 88 has a substantially flat inner-facing bracket surface 89 for receiving a wear pad 94. The wear pads 94 each have an inner-facing surface 96. When mounted to the thermally conforming liner 32 as shown in FIG. 7 the wear pad inner-facing surfaces 96 face each other and define a channel width D. When mounted to a thermally conforming liner 32 that has then been inserted into a fan containment case 30 as shown in FIG. 8, the inner-facing surfaces 96 face the torque block 62 and may abut the outwardly-opposing side surfaces 70 of the torque block 62.

FIG. 8 is an axial view of an embodiment of an anti-torsion assembly 60 taken along line 8-8 of FIG. 5. The assembly 60 comprises a torque block 62 and a pair of opposing L-brackets 84. The torque block 62 may be mounted to the inner diameter surface 57 of the ballistic liner 55. Alternatively, the torque block 62 may be mounted directly to the inner diameter surface 58 of the fan containment case 30. The L-brackets 84 are mounted to an outer diameter surface 59 of the thermally conforming liner 32.

The anti-torsion assembly 60 further comprises a wear pad 94 affixed to the inner-facing bracket surface 89 of each L-bracket 84 and abutting the outwardly-opposing side surfaces 70 of the torque block 62. When the L-brackets 84 are brought into axial alignment with the torque block 62 as shown in FIG. 8, there may be no gaps or very small gaps on either side of the torque block 62 between the outwardly-opposing side surfaces 70 of the torque block 62 and the wear pads 94 to minimize relative movement. The gaps are not necessarily equal due to tolerances and in practice the wear pads 94 may abut one or the other of the outwardly-opposing side surfaces 70 of the torque block 62.

As explained in more detail below, the L-brackets 84 are positioned onto the outer diameter surface 59 of the thermally conforming liner 32, using a spacer carried on a ring structure, and then bonded or otherwise secured to the thermally conforming liner 32. Locating the wear pads 94 on the L-brackets 84 eliminates the need to factor in the tolerances of the wear pad thicknesses, because only the tolerance of the spacer used to locate (position) the L-brackets 84 with respect to each other while mounting to the thermally conforming liner 32 is required. This tolerance is constant, whether or not the wear pads 94 are present on the L-brackets 84, and is set by the spacer. Thus, the need to perform machining on the wear pads 94 to assure proper spacing between the torque block 62 and the L-brackets 84 is eliminated.

The torque block and the L-brackets 84 may be made from aluminum or any suitable material. The wear pads 94 may be made of any light, low friction, wear resistant material that can be bonded to metal, including but not limited to CP-0664 fiber-reinforced composite fabric and polytetraflouroethylene (PTFE), both available commercially from E.I. DuPont de Nemours and Company.

In another aspect of the disclosure a method of assembling a fan case assembly is provided. The method may comprise the following steps: Multiple torque blocks 62 are mounted to the inner diameter surface 58 of the fan containment case 30. That is, the torque blocks 62 are mounted to a structure, such as a ballistic liner, so that the torque blocks 62 are in stationary relationship to the fan containment case 30.

Wear pads 94 are bonded or otherwise affixed to the inner-facing bracket surfaces 89 of multiple pairs of L-brackets 84. The pairs of wear-pad-carrying L-brackets 84 are positioned onto an outer diameter surface 59 of a thermally conforming liner 32 using spacers so that the inner-facing surfaces 96 of the wear pads 94 abut the outwardly-opposing sides of the spacers, and then the L-brackets 84 are bonded or otherwise secured to the thermally conforming liner 32. After bonding of the L-brackets 84, the spacers are removed to create a channel between the L-brackets. The thermally conforming liner 32 is then ready for inserting into the fan containment case 30 so that each torque block 62 extends within a channel, thereby becoming captured between a pair of L-brackets 84.

Positioning the wear-pad-carrying L-brackets 84 on the thermally conforming liner 32, and thus setting the channel width D, may be accomplished as follows: Spacers of predetermined width may be mounted onto a ring structure having the same outer diameter dimension as the thermally conforming liner 32. The spacer width, which is the same as the L-bracket channel width D, should be within an acceptable tolerance and should be slightly greater than the circumferential width W of the torque block 62. The L-brackets 84, each carrying a wear pad 94 on its inner-facing bracket surface 89, are placed onto the outer diameter surface 59 of the thermally conforming liner 32 so that the wear pads 94 abut the sides of the spacer. Then the L-brackets 84 are secured to the thermally conforming liner 32 and the spacers are removed.

Figure 9:
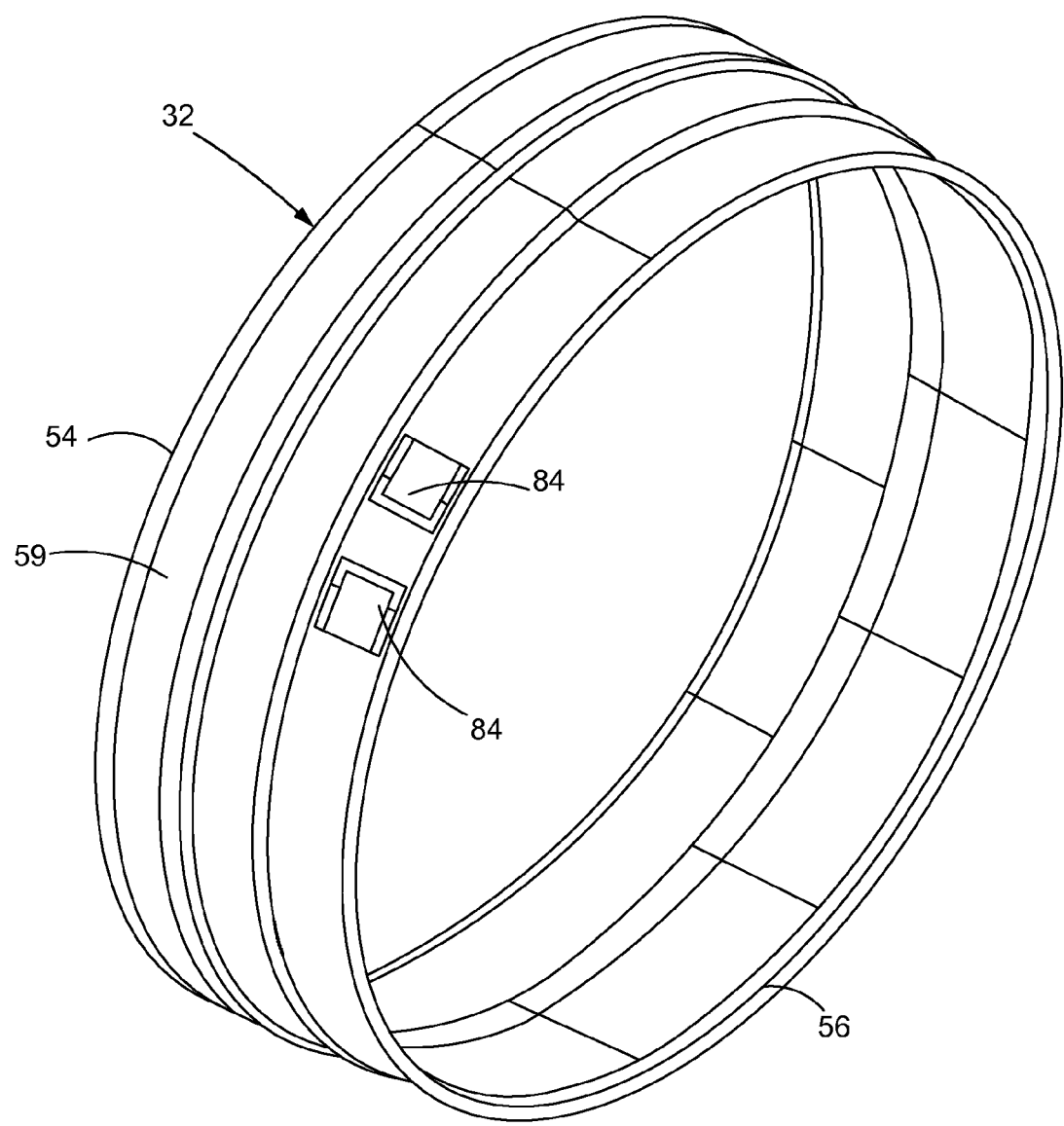
FIG. 9 is a perspective view of an embodiment of a thermally conforming liner showing at least one pair of exemplary L-brackets mounted to a thermally conforming liner.

FIG. 9 is a perspective view of a thermally conforming liner 32 and at least one representative pair of L-brackets 84. The L-brackets 84 have been positioned according the positioning method just described and have been secured to the outer diameter surface 59 of the thermally conforming liner 32. Multiple L-bracket pairs may be positioned circumferentially around the thermally conforming liner 32. The thermally conforming liner 32 may carry any suitable number of L-bracket pairs.

In another aspect of the disclosure, a method of repairing a fan case assembly 28 is provided. The thermally conforming liner 32 is removed from the fan containment case 30. For each anti-torsion assembly 60, if the circumferential width W of the torque block 62 is not within a predetermined tolerance, then the torque block 62 is machined or is replaced with a replacement torque block 62 so that the circumferential width W of the machined or replacement torque block 62 meets the predetermined tolerance. The predetermined tolerance may correlate to a maximum specification width W smaller than a minimum specification width of the spacer used to position the L-brackets 84 onto the thermally conforming liner 32. In other words, the width tolerances should be such that gaps between the outwardly-opposing side surfaces 70 of the torque block 62 and the inner-facing surfaces 96 of the wear pads 94 fall within a certain range. The machined or replacement torque block 62 is mounted to the fan containment case 30.

For each pair of L-brackets 84 on the thermally conforming liner 32, the wear pads 94 and/or the L-brackets 84 may be replaced if damaged or worn. Then the wear-pad-carrying L-brackets 84 are re-positioned onto an outer diameter surface 59 of the thermally conforming liner 32 so that the wear pads 94 abut the spacer. The spacer width should be substantially equal to the predetermined tolerance. The L-brackets 84 are then secured such as by bonding to the thermally conforming liner 32. The spacers are removed. Finally, the thermally conforming liner 32 is reinserted into the fan containment case 30 so that at least a portion of the torque block 62 is interposed between the inner-facing surfaces 96 of the L-bracket mounted wear pads 94.

APPLICATIONS

The disclosed apparatus and method of assembly are intended for use in jet engines and, specifically, turbofan jet engines. The disclosed apparatus and method may be applicable in any situation where wear is an issue and one of the wear surfaces is a channel formed by two independent parts located by a spacer.

While the present disclosure has been shown and described in terms of one or more exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. An anti-torsion assembly comprising:
 a torque block having outwardly-opposing side surfaces;
 a pair of L-brackets, each L-bracket having an inner-facing bracket surface; and
 a wear pad bonded to the inner-facing bracket surface of each of the L-brackets, and adapted to abut one of the outwardly-opposing side surfaces of the torque block.

2. The anti-torsion assembly of claim 1 wherein:
 the torque block is affixed to a fan containment case; and
 the L-brackets are affixed to a thermally conforming liner disposed within the fan containment case so that each inner-facing bracket surface faces one of the outwardly-opposing side surfaces of the torque block.

3. The anti-torsion assembly of claim 2 wherein:
 the wear pads are spaced apart from each other a predetermined distance.

4. The anti-torsion assembly of claim 3 wherein:
 the torque block has a circumferential width which is slightly less than the predetermined distance.

5. The anti-torsion assembly of claim 4 wherein:
 the predetermined distance is equal to the width of a spacer.

6. The anti-torsion assembly of claim 4 further comprising:
 a spacer having a spacer width; and wherein
 the predetermined distance is equal to the spacer width.

7. The anti-torsion assembly of claim 6 wherein:
 each wear pad has an inner-facing surface adjacent one of the outwardly-opposing side surfaces and separated therefrom by a gap distance; and
 the sum of the gap distances equals the spacer width minus the circumferential width.

8. The anti-torsion assembly of claim 7 wherein:
 each gap distance has a maximum equal to the difference between the spacer width minus the circumferential width.

9. The anti-torsion assembly of claim 1 wherein:
 each L-bracket comprises a foot member and a leg member extending from the foot member; and
 the inner-facing bracket surface is located on the leg member.

10. A method of assembling a fan case assembly, the method comprising the steps of:
 (a) mounting multiple torque blocks onto an inner diameter surface of a fan containment case, each torque block having outwardly-opposing side surfaces and a circumferential width;
 (b) positioning multiple pairs of L-brackets onto an outer diameter surface of a thermally conforming liner, each L-bracket having a wear pad bonded to an inner-facing bracket surface of the L-bracket, each pair of L-brackets being positioned so that the wear pads abut a spacer, the spacers having a spacer width;
 (c) securing the L-brackets to the thermally conforming liner;
 (d) removing the spacers to create a channel between each pair of L-brackets; and
 (e) inserting the thermally conforming liner into the fan containment case so that the torque blocks extend into the channels.

11. The method of claim 10 wherein:
 before step (a) each torque block is machined so that its circumferential width is within a predetermined tolerance.

12. The method of claim 10 wherein:
 before step (a) each torque block is machined so that its circumferential width is slightly less than the spacer width.

13. The method of claim 10 comprising the further step of:
 (f) positioning the thermally conforming liner within the fan containment case so that an inner-facing surface of each wear pad is adjacent one of the outwardly-opposing side surfaces and is separated therefrom by a gap distance, wherein the maximum gap distance for each wear pad equals the spacer width minus the circumferential width.

14. The method of claim 10 wherein:

the multiple pairs of L-brackets are secured to the thermally conforming liner in circumferentially spaced apart relationship.

15. An anti-torsion assembly comprising:

a torque block affixed to a fan containment case, the torque block having outwardly-opposing side surfaces, the outwardly-opposing side surfaces defining a circumferential width;

a pair of L-brackets affixed to a thermally conforming liner disposed within the fan containment case, each L-bracket comprising a foot member and a leg member extending from the foot member, the leg member having a bracket surface facing one of the outwardly-opposing side surfaces; and a wear pad bonded to each bracket surface, each wear pad having an inner-facing surface adjacent one of the outwardly-opposing side surfaces and separated therefrom by a gap distance;

wherein the maximum gap distance equals a predetermined distance minus the circumferential width.

16. The anti-torsion assembly of claim 15 further comprising:

a spacer defining a spacer width; and wherein the predetermined distance is equal to the spacer width.

17. The anti-torsion assembly of claim 15 wherein:

the torque block and L-brackets are made of aluminum.

18. The anti-torsion assembly of claim 15 wherein:

the wear pads are made of a light, low friction, wear resistant material.

19. The anti-torsion assembly of claim 15 wherein:

the wear pads are made of fiber-reinforced composite fabric.

20. The anti-torsion assembly of claim 15 wherein:

the wear pads are made of polytetraflouroethylene.

* * * * *